(12) United States Patent
Higley et al.

(10) Patent No.: US 6,969,567 B1
(45) Date of Patent: Nov. 29, 2005

(54) MULTI-CELL BATTERY

(75) Inventors: Lin R. Higley, Troy, MI (US); Marshall D. Muller, Farmington, MI (US); Dennis A. Corrigan, Troy, MI (US)

(73) Assignee: Texaco Ovonic Battery Systems, LLC, Troy, MI (US)

( * ) Notice: Subject to any disclaimer, the term of this patent is extended or adjusted under 35 U.S.C. 154(b) by 516 days.

(21) Appl. No.: 09/707,009

(22) Filed: Nov. 6, 2000

Related U.S. Application Data

(63) Continuation-in-part of application No. 09/139,384, filed on Aug. 23, 1998, now Pat. No. 6,255,015.

(51) Int. Cl.[7] .................................................. H01M 6/42
(52) U.S. Cl. ........................ 429/149; 429/153; 429/99
(58) Field of Search ................................. 429/149, 152, 429/153, 154, 156, 157, 158, 163, 176, 177, 429/185, 57, 53, 73, 82, 84, 99, 96

(56) References Cited

U.S. PATENT DOCUMENTS

| | | | | |
|---|---|---|---|---|
| 5,059,496 A | * | 10/1991 | Sindorf | 429/101 |
| 5,478,363 A | * | 12/1995 | Klein | 29/623.1 |
| 5,618,641 A | | 4/1997 | Arias | |

* cited by examiner

*Primary Examiner*—Raymond Alejandro
(74) *Attorney, Agent, or Firm*—Philip H. Schlazer; Marvin S. Siskind

(57) ABSTRACT

A rechargeable multi-cell battery including a plurality of electrochemical cells. Each of the cells includes a gas port that allows passage of cell gases into and out of the cell but prevent passage of cell electrolyte out of the cell. The gas port may be a gas permeable membrane. The multi-cell batter may be a bipolar battery.

27 Claims, 11 Drawing Sheets

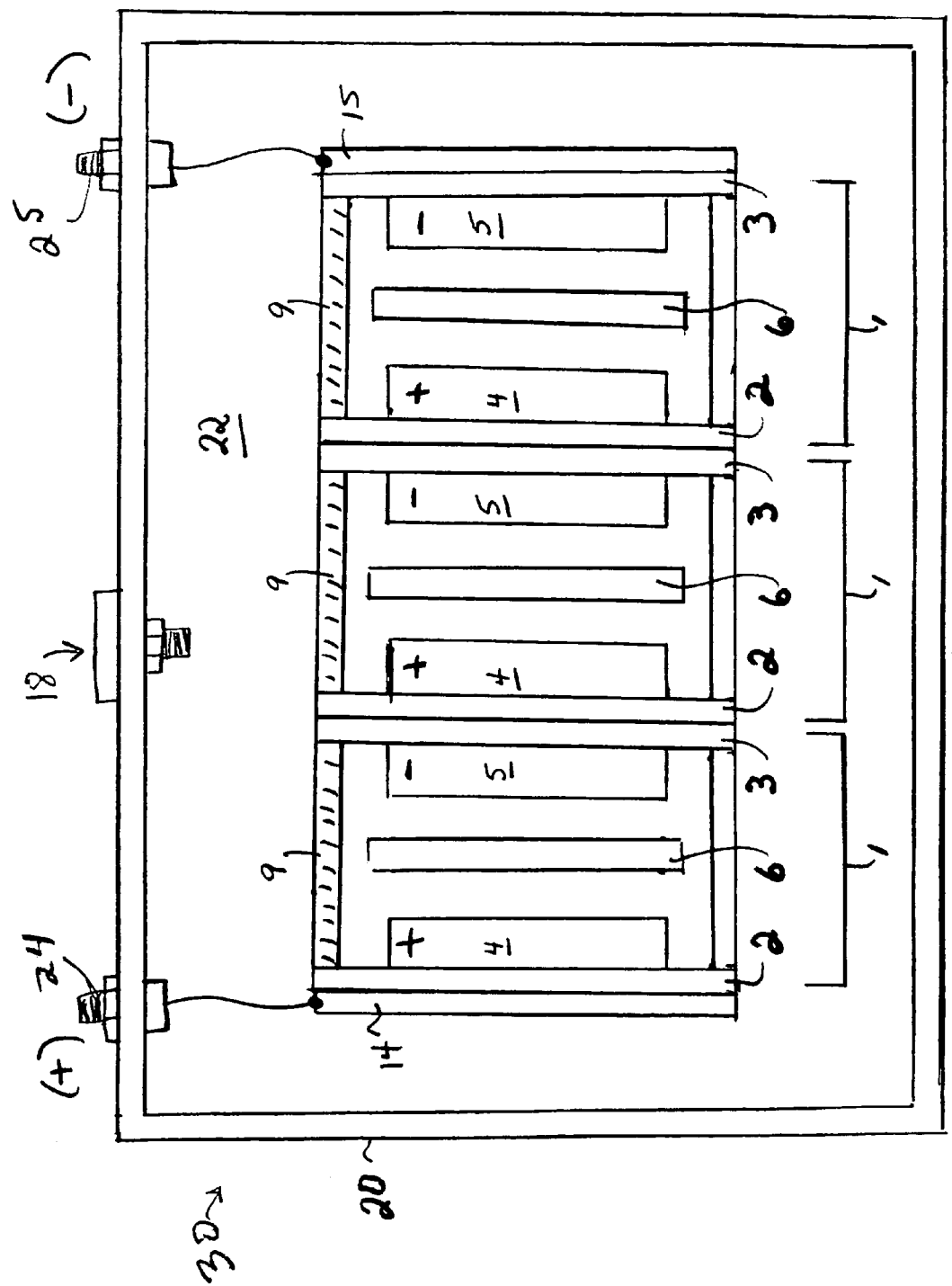

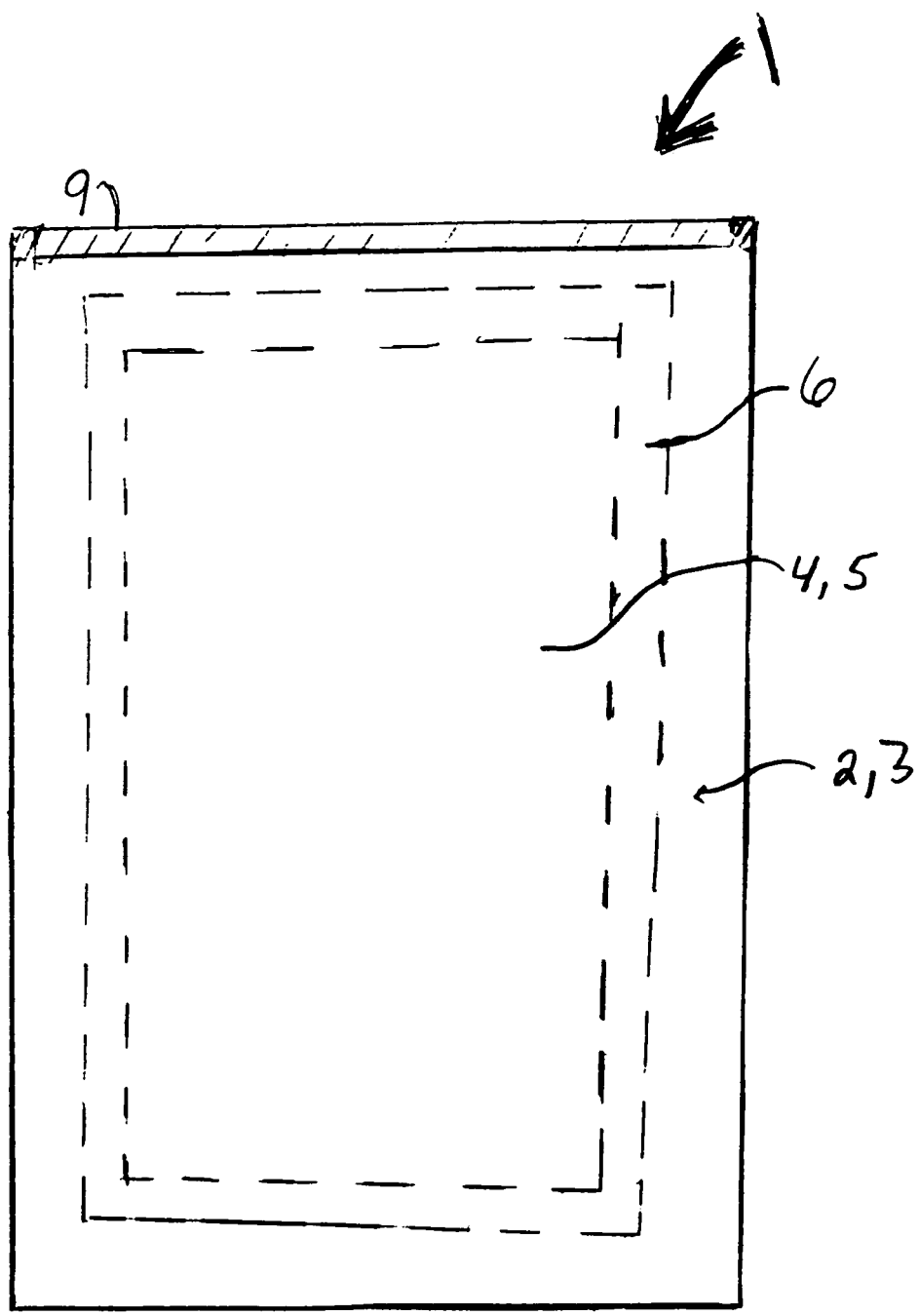
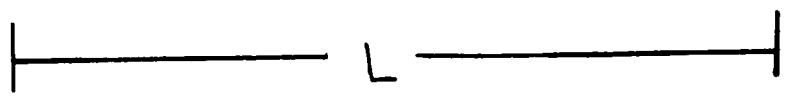
FIG. 2B

MULTI-CELL BATTERY

RELATED APPLICATION INFORMATION

This application is a continuation-in-part of U.S. patent application Ser. No. 09/139,384, filed on Aug. 23, 1998 now U.S. Pat. No. 6,255,015.

FIELD OF THE INVENTION

The present invention relates to rechargeable electrochemical cells. In particular, the present invention relates to rechargeable alkaline electrochemical cells.

BACKGROUND OF THE INVENTION

Multi-cell, rechargeable batteries are used in a variety of industrial and commercial applications such as fork lifts, golf carts, uninterruptable power supplies, and electric vehicles.

Rechargeable lead-acid batteries are a useful power source for starter motors for internal combustion engines. However, their low energy density (about 30 Wh/kg) and their inability to reject heat adequately, makes them an impractical power source for an electric vehicles (EV), hybrid electric vehicles (HEV) and 2–3 wheel scooters/motorcycles. Electric vehicles using lead-acid batteries have a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel-metal hydride batteries ("Ni—MH batteries") are superior to lead-acid batteries and are the ideal battery available for electric vehicles, hybrid vehicles and other forms of vehicular propulsion. For example, Ni—MH batteries, such as those described in U.S. Pat. No. 5,277,999, the disclosure of which is incorporated herein by reference, have a much higher energy density than lead-acid batteries, can power an electric vehicle over 250 miles before requiring recharge, can be recharged in 15 minutes, and contain no toxic materials.

Extensive research has been conducted in the past into improving the electrochemical aspects of the power and charge capacity of nickel-metal hydride batteries. This is discussed in detail in U.S. Pat. Nos. 5,096,667, 5,104,617, 5,238,756 and 5,277,999, the contents of which are all incorporated by reference herein.

Multi-cell nickel-metal hydride batteries may be packaged in a variety of configurations. For example, individual cells may simply be secured together with the use of end plates and a strap to form a "bundle" of individual cells. Alternatively, the individual cells may be all be housed within a common outer battery case. Examples of multi-cell batteries are provided in U.S. patent application Ser. No. 09/139,384, now U.S. Pat. No. 6,255,015 the disclosure of which is incorporated herein by reference.

The electrochemical cells of multi-cell batteries may be electrically coupled in series by conductive links, or they may be formed in a bipolar configuration where an electrically conductive bipolar layer serves as the electrical interconnection between adjacent cells as well as a partition between the cells. To be successfully utilized, the bipolar layer must be sufficiently conductive to transmit current from cell to cell, chemically stable in the cell's environment, capable of making and maintaining good electrical contact to the electrodes and capable of being electrically insulated and sealable around the boundaries of the cell so as to contain electrolyte in the cell. Examples of bipolar batteries are provided in U.S. Pat. Nos. 5,393,617, 5,478,363, 5,552,243, and 5,618,641, the disclosures of which are all incorporated by reference herein.

The requirements for making high quality multi-cell rechargeable batteries become more difficult to achieve in the case of nickel-metal hydride batteries due to the charging potential of the cells which can accelerate corrosion of battery components, to the creep nature of the alkaline electrolyte that can cause self-discharge between cells, and to the higher cell pressures which can deform and damage the cell enclosures. The present invention provides an improved design for rechargeable multi-cell batteries applicable to all battery chemistries and, in particular, to the rechargeable nickel-metal hydride chemistry.

SUMMARY OF THE INVENTION

Disclosed herein is a multi-cell battery, comprising:
a battery case; and
a plurality of electrochemical cells housed in the battery case, each of the cells including:
  at least one positive electrode, at least one negative electrode and an electrolyte; and
  an enclosure housing the at least one positive electrode, the at least one negative electrode and the electrolyte, the enclosure including a gas port allowing passage of cell gases into and out of the cell but preventing passage of the electrolyte out of the cell.

Disclosed herein is a multi-cell battery, comprising:
a battery case; and
a plurality of electrochemical cells housed in the battery case, each of the cells including:
  at least one positive electrode, at least one negative electrode and an electrolyte; and
  an enclosure housing the at least one positive electrode, the at least one negative electrode and the electrolyte, the enclosure including a gas permeable membrane allowing passage of cell gases into and out of the cell but preventing passage of the electrolyte out of the cell.

Also disclosed herein is a multi-cell battery, comprising:
a battery case; and
a plurality of electrochemical cells housed in the battery case, each of the cells including:
  at least one positive electrode, at least one negative electrode and an electrolyte;
  an enclosure housing the at least one positive electrode, the at least one negative electrode and the electrolyte, the enclosure having an opening allowing passage of cell gases into and out of the cell; and
  a hydrophobic material positioned relative to the opening so as to prevent passage of the electrolyte out of the cell.

Also disclosed herein is a bipolar electrochemical battery, comprising:
a battery case; and
a stack of at least two serially coupled electrochemical cells housed within the case, each of the cells comprising:
  at least one positive electrode, at least one negative electrode, and an electrolyte; and
  an enclosure housing the at least one positive electrode, the at least one negative electrode and the electrolyte, the enclosure including a gas permeable membrane allowing passage of cell gases into and out of the cell but preventing passage of the electrolyte out of the cell.

Also disclosed herein is a bipolar electrochemical battery, comprising:

a battery case; and a stack of at least two serially coupled electrochemical cells housed within the case, each of the cells comprising:

at least one positive electrode, at least one negative electrode, and an electrolyte; and an enclosure housing the at least one positive electrode, the at least one negative electrode and the electrolyte, the enclosure having an opening allowing passage of cell gases into and out of the cell; and a hydrophobic material positioned relative to the opening so as to prevent passage of the electrolyte out of the cell.

BRIEF DESCRIPTION OF THE DRAWINGS

FIG. 1 shows a multi-cell bipolar battery of the present invention;

FIG. 2B shows a cross-sectional view, parallel to the length, of a bipolar wafer cell of the present invention;

DETAILED DESCRIPTION OF THE INVENTION

Figure 2A:
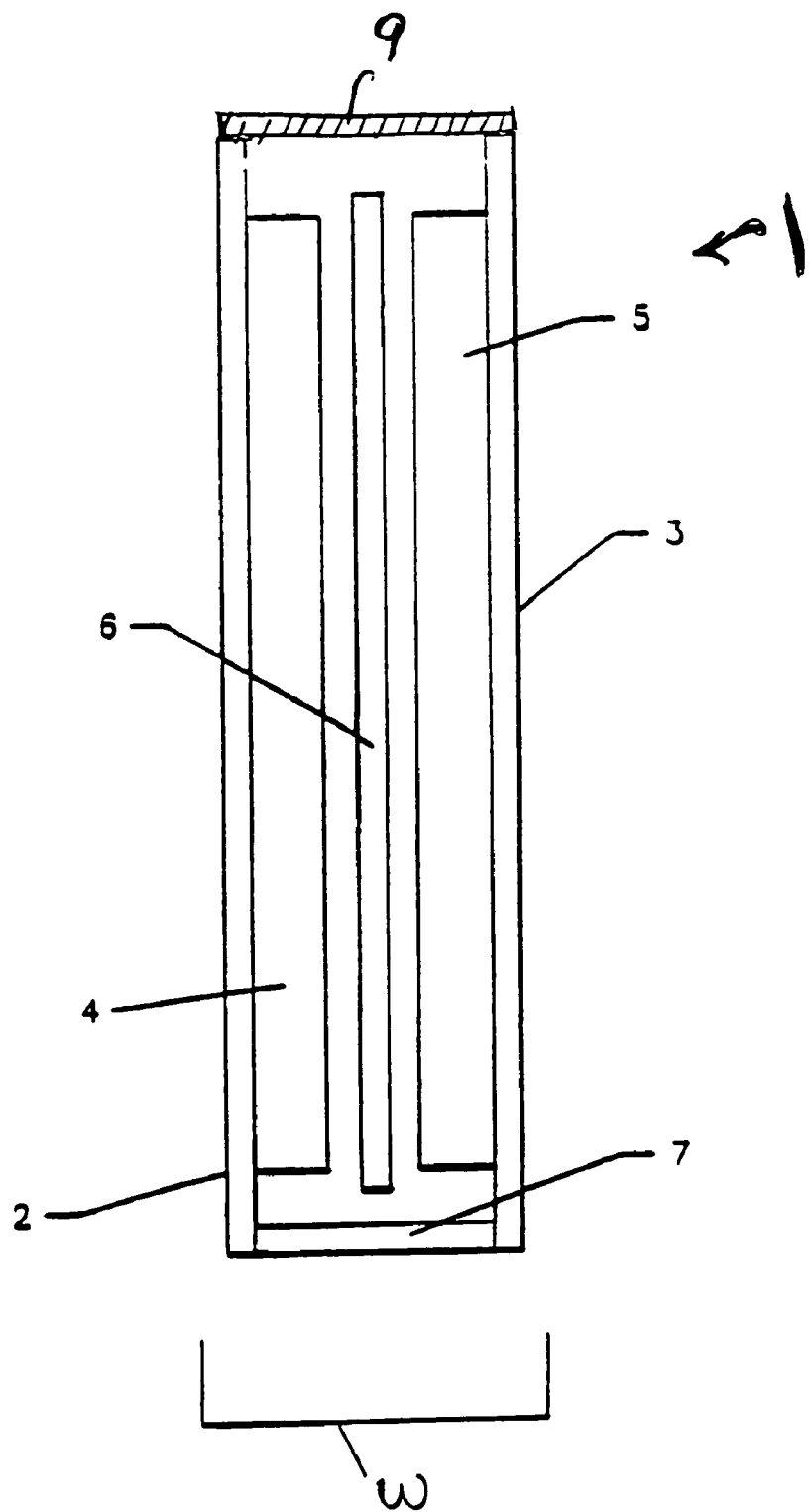
FIG. 2A shows a cross-sectional view, parallel to the width, of a bipolar wafer cell of the present invention.

The present invention is directed to an electrochemical battery comprising a plurality of electrochemical cells disposed in a common pressure vessel. Each electrochemical cell includes a specially designed gas port which permits the passage of the cell gases into and out of the cell but which prevents the passage of cell electrolyte out of the cell. In one embodiment, this gas port is in the form of a gas permeable membrane that allows the cell gases to pass into and out of the cell but which prevents passage the cell electrolyte out of the cell.

In one embodiment of the present invention, the electrochemical battery is a bipolar battery. FIG. 1 shows a bipolar battery 30 of the present invention. The bipolar battery comprises a plurality of serially coupled electrochemical cells 1 all housed within a common battery case 20. Each of the electrochemical cells 1 shown in FIG. 1 is referred to herein as a "wafer cell". The wafer cell 1 is specially designed so that the plurality of such cells can be easily "stacked" together side-by-side in a bipolar configuration. The battery case 20 serves as a common pressure vessel for each of the electrochemical cells 1 wherein gases from each of the individual wafer cells 1 are released by each of the cells by way of the gas permeable membrane 9 and are shared within the case 20.

The battery case 20 may be sealed to avoid the loss of cell gases from the interior of the case 20. A resealable vent 18, set to release gases above a maximum operating pressure, may be used to safely deal with any excessive gas generation during operation.

Figure 2C:
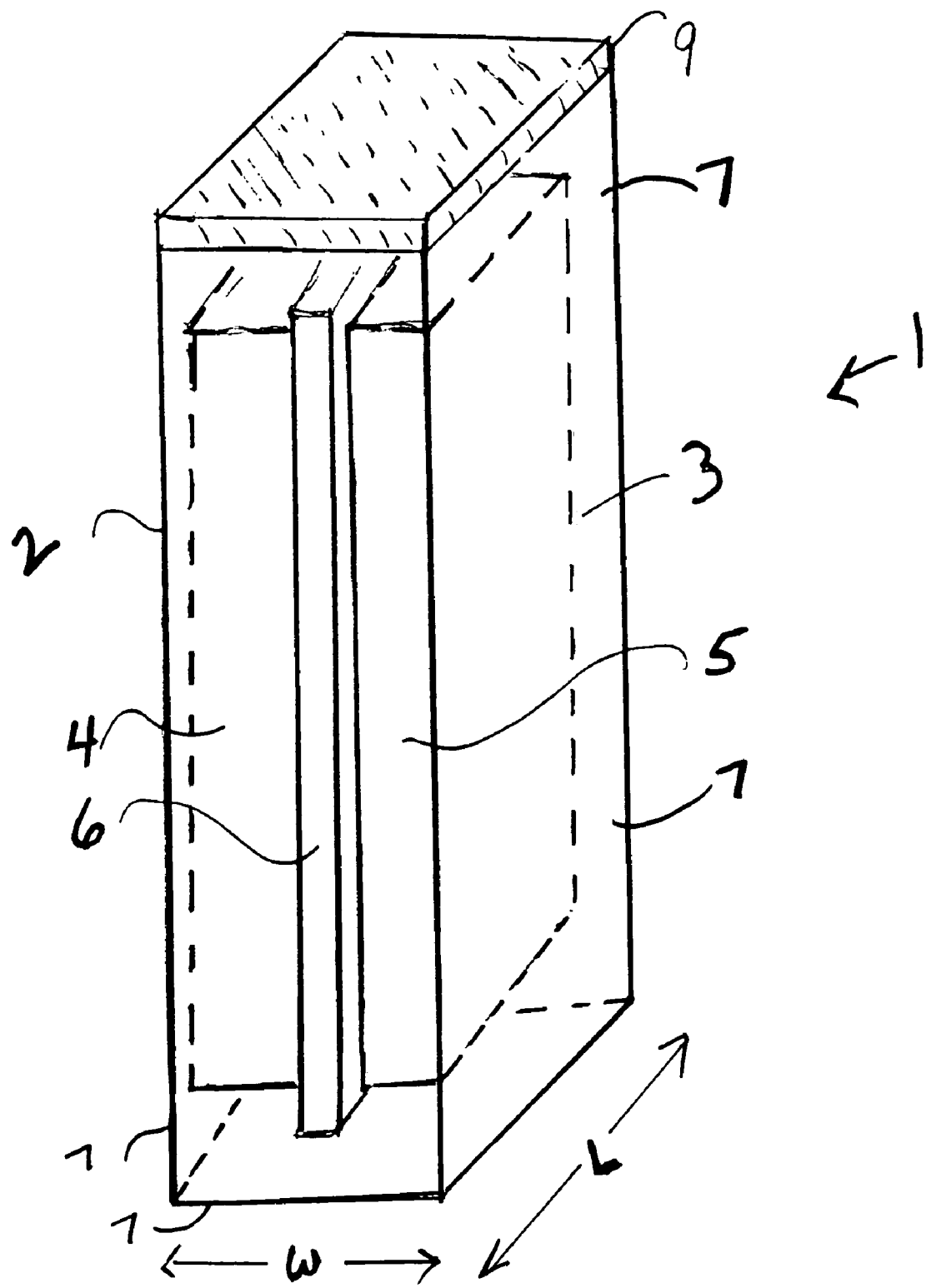
FIG. 2C shows a three-dimensional view of a bipolar wafer cell of the present invention.

FIG. 2A is a two-dimensional, cross-sectional view of an embodiment of single wafer cell 1 through the width "W" of the cell. The width "W" of the cell is parallel to the plane of the illustration. The length "L" of the cell is perpenducular to the plane of the illustration. FIG. 2B is a two-dimensional, cross-section view of the same wafer cell through the length "L" of the cell. That is, the length "L" is parallel to the plane of the illustration of FIG. 2B. FIG. 2C is a three-dimensional view of the same wafer cell 1. The wafer cell 1 includes a positive electrode 4 and a negative electrode 5. The positive and negative electrodes 4, 5 are prevented from making direct physical contact by a separator 6 which is disposed between the electrodes 4,5. The electrochemical cell further includes an electrolyte which wets the electrodes 4, 5 and the separator 6. The separator 6 may be porous so as to absorb the electrolyte. The separator material may be formed of synthetic resin fibers (such as polyamide), polypropylene fibers or a combination thereof. The separator between the electrodes typically has a porous structure capable of absorbing and holding the electrolyte within the cell. In one embodiment of the invention the separator includes two layers of non-woven polypropylene.

Generally, the electrolyte may be an aqueous or a non-aqueous electrolyte. An example of a nonaqueous electrochemical cell is a lithium-ion cell which uses intercalation compounds for both anode and cathode and a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Examples of alkaline electrochemical cells are nickel cadmium (Ni—Cd) cells and nickel-metal (Ni—MH) hydride cells.

Preferably, the electrochemical cells of the present invention are alkaline electrochemical cells. The alkaline electrolyte may be an aqueous solution of an alkali hydroxide. Preferably, the alkaline electrolyte includes an aqueous solution of potassium hydroxide, sodium hydroxide, lithium hydroxide or mixtures thereof. The alkaline electrolyte may be a mixed hydroxide of potassium and lithium hydroxide. In the one embodiment of the present invention, the alkaline electrochemical cell is a nickel-metal hydride cell (Ni—MH) having a negative electrode 5 comprising a hydrogen storage material that can electrochemically and reversibly store hydrogen and a positive electrode 4 comprising a nickel hydroxide active material. Various active materials for the positive and the negative electrodes are discussed in more detail below.

The positive and negative electrodes are contained between a first electrically conductive outer layer 2 and a second electrically conductive outer layer 3. The first conductive outer layer 2 is a "first conductive portion" of the enclosure of the wafer cell. Likewise, the second conductive outer layer 3 is "a second conductive portion" of the enclosure of the wafer cell. The first and second conductive portions of the enclosure are electrically isolated from one another.

Generally, the conductive outer layers 2 and 3 may be formed of any conductive material including, but not limited to, metals (for example, nickel or a nickel alloy) and conductive polymers. Preferably, the conductive outer layers 2 and 3 are each formed of a conductive polymer. The conductive polymer may be a carbon-filled polymeric material. An example of a carbon-filled plastic is provided in U.S. Pat. No. 4,098,976, the disclosure of which is incorporated by reference herein. The plastic material may be filled with a finely divided carbon (such as a vitreous carbon, carbon black or carbon in graphite form) to form a non-corrosive, liquid-impervious, conductive layer. It is also possible to form the conductive polymeric material by filling a plastic material with a finely divided metal such a nickel. The materials chosen for the conductive outer layers are impermeable to the cell electrolyte so as to prevent the electrolyte that is within each cell from leaving the cell.

The conductive outer layers 2 and 3 make electrical contact to the positive and negative electrodes 4 and 5, respectively. The conductive outer layer 2 is preferably adjacent to (and most preferably adjoins) the positive electrode 4 and the conductive outer layer 3 is preferably adjacent to (and most preferably adjoins) the negative electrode 5. In order to enhance the electrical contact between the electrodes and the outer layers, a conductive paste or cement may be used between each of the conductive polymeric outer layers and the respective electrode with which it is in electrical contact. The conductive outer layer 2 is also referred to as the "positive face" of the wafer cell 1 and the conductive outer layer 3 is also referred to as the "negative face" of the wafer cell 1.

In the embodiment of the wafer cell shown in FIG. 2A, the positive electrode 4, the negative electrode 5, the separator 6, and the two outer layers 2, 3 are all substantially flat and are preferably in tight physical and electrical contact with the adjacent components. The design illustrated in FIG. 2A permits construction of a wafer cell which is relatively thin.

Furthermore, in the embodiment of the wafer cell shown in FIG. 2A, the wafer cell 1 comprises a single positive electrode 4 and a single negative electrode 5. However, other configurations are possible wherein a wafer cell comprises a plurality of positive and a plurality of negative electrodes to increase cell capacity and/or electrode area. In this case the positive and negative electrodes may include tabs or current collectors which electrically connect all of the negative electrodes together and which electrically connect all of the positive electrodes together.

In order for the electrodes, the separator and the electrolyte to be contained within an enclosed wafer cell, the conductive polymeric outer layers 2 and 3 preferably have a physical area which is larger than the area of the electrodes 4 and 5. That is, the perimeter of the outer layers 2, 3 preferably extends beyond the perimeter of the respective adjacent electrode 4, 5. This is shown in FIG. 2B. Also, in the embodiment of the cell shown in FIG. 2B, the perimeter of the separator 6 also extends beyond the perimeter of the electrodes 4, 5.

Referring to FIGS. 2A–C, it is seen that the enclosure of the wafer cell 1 includes a nonconductive polymeric material 7 which is sealed peripherally to the conductive outer layers 2 and 3 to form a nonconductive border 7 around at least a portion of the perimeter of the wafer cell. In the embodiment shown in FIGS. 2A–C, the nonconductive border 7 is formed around the bottom and the sides of the perimeter of the wafer cell. The nonconductive border 7 physically separates and electrically isolates the two conductive outer layers 2 and 3.

Generally, the nonconductive border 7 may be formed of any nonconductive material which is inert to the electrochemical environment of the cell and which is also impermeable to the cell electrolyte. Preferably, the nonconductive material is a nonconductive polymer. The nonconductive polymer may include polypropylene and/or a vinyl polymer. It may further include a strength enhancing filler material. The nonconductive border material 7 may be sealed to the conductive outer layers 2, 3 via adhesive. Alternately, the nonconductive polymer 7 may be a thermoplastic which can be heat sealed to the perimeter of the conductive outer layers 2 and 3.

As discussed, in the embodiment of the wafer cell shown in FIGS. 2A–C, the nonconductive border material 7 is sealed around at least a portion of the perimeter of the wafer cell. In the particular embodiment shown, the nonconductive material 7 is sealed around the bottom portion and the side portions of the perimeter of the wafer cell. The remaining portion of the perimeter of the wafer cell (i.e., the portion of the perimeter not covered by the nonconductive material 7) is sealed by a gas permeable material 9 which allows passage of the cell gases out of and into the wafer cell but which prevents the passage of the cell electrolyte. This gas permeable region of the enclosure forms a gas port for the cell which allows the gases to freely flow into and out of the cell but which prevents the cell electrolyte from leaving the cell. In one embodiment of the invention, the gas permeable material is in the form of a gas permeable membrane.

The membrane material 9 is formed from a material which is permeable to the cell gases so as to allow the cell gases to go out of and into the wafer cell. However, the membrane material is also preferably impermeable to the cell electrolyte thereby preventing the electrolyte from leaving the cell. More preferably, the membrane material is a hydrophobic material.

As discussed, the electrolyte used is preferably an alkaline electrolyte. Hence, the membrane material is preferably one which is impermeable to an alkaline electrolyte. The hydrophobic nature of the material used is preferably "electrolyte-phobic" and more preferably "alkaline-phobic". Hence, the material is preferably one which is not readily wetted by the electrolyte and is more preferably one which is not readily wetted by an alkaline electrolyte. In one embodiment, the wetting or contact angle of the membrane material is preferably greater than about 90°. Furthermore, the membrane material is also preferably a nonconductive material. Hence, the membrane material may form all or a portion of the nonconductive border around the perimeter of the wafer cell.

Preferably, the membrane material comprises a polymeric material. In particular, the material may comprise a polymeric material that is modified with the addition of an inorganic salt such as a calcium carbonate. An example of a material which may be used is the breathable type XBF-100W EXXAIRE film that is supplied by Tridegar products. This film is a polyethylene film that has been mixed with fine calcium carbonate particles and then further stretched to make it porous. In one embodiment, the layer is chosen to have a thickness of about 0.25 gauge (0.25 g per square meters), which corresponds to about 0.001 inch. The Gurley porosity of the material is chosen to be about 360 (360 seconds for 100 cc of gas to pass per square inch with a gas pressure of 4.9 inches of water). The hydrophobic nature of this film is demonstrated by a very high contact angle in 30% KOH electrolyte of about 120 degrees.

It is noted that it is also possible to form the gas permeable membrane from a material which is not polymeric. For example, the membrane may be formed from an inorganic salt such as calcium carbonate or calcium fluoride. The salt may be made into a particulate and the particles may be pressed together to form a porous body. This porous body can serve as the gas permeable membrane.

As noted, in addition to being gas permeable, the material used for the membrane 9 is preferably nonconductive so as to insure electrical isolation between the first conductive layer 2 and second conductive layer 3.

Hence, the gas exchange membrane may comprise a nonconductive polymer.

In the embodiments shown in FIGS. 2A–C, the membrane material 9 is sealed across a top portion of the wafer cell 1. The membrane material 9 is sealed to the nonconductive border material 7 as well as to the conductive polymeric outer layers 2, 3. Sealing is preferably accomplished by heat sealing, although other means (such as adhesive) is also possible. The membrane material 9, the nonconductive border material 7, and the first and second conductive outer layers 2 and 3 form an enclosure for the wafer cell 1 that houses the pair of electrodes, the separator and the electrolyte. The first conductive outer layer 2 forms a first conductive portion of this enclosure. Likewise, the second conductive outer layer 3 forms a second conductive portion of this enclosure. The first and the second conductive portions are electrically isolated from each other by the nonconductive border material 7 and by the membrane material 9. The enclosure shown in FIGS. 2A–C completely surrounds the electrodes 4,5, the separator 6 and the electrolyte.

In the embodiment of the wafer shell shown in FIGS. 2A–C, the membrane material 9 is positioned on a top portion of the border around the perimeter of the wafer cell. However, the membrane material 9 may be positioned anywhere on the border along the perimeter of the cell between the first and second conductive portions. In an alternate embodiment, the wafer cell may include a plurality of separate membranes positioned various places around the border of the wafer cell. In yet another embodiment of the invention, the entire border of the wafer cell may be formed of the membrane material 9. In still another embodiment of the invention, it is possible that one or more openings may be placed in the conductive outer layers 2, 3 and these openings may be at least partially covered by the membrane material 9.

Figure 3:
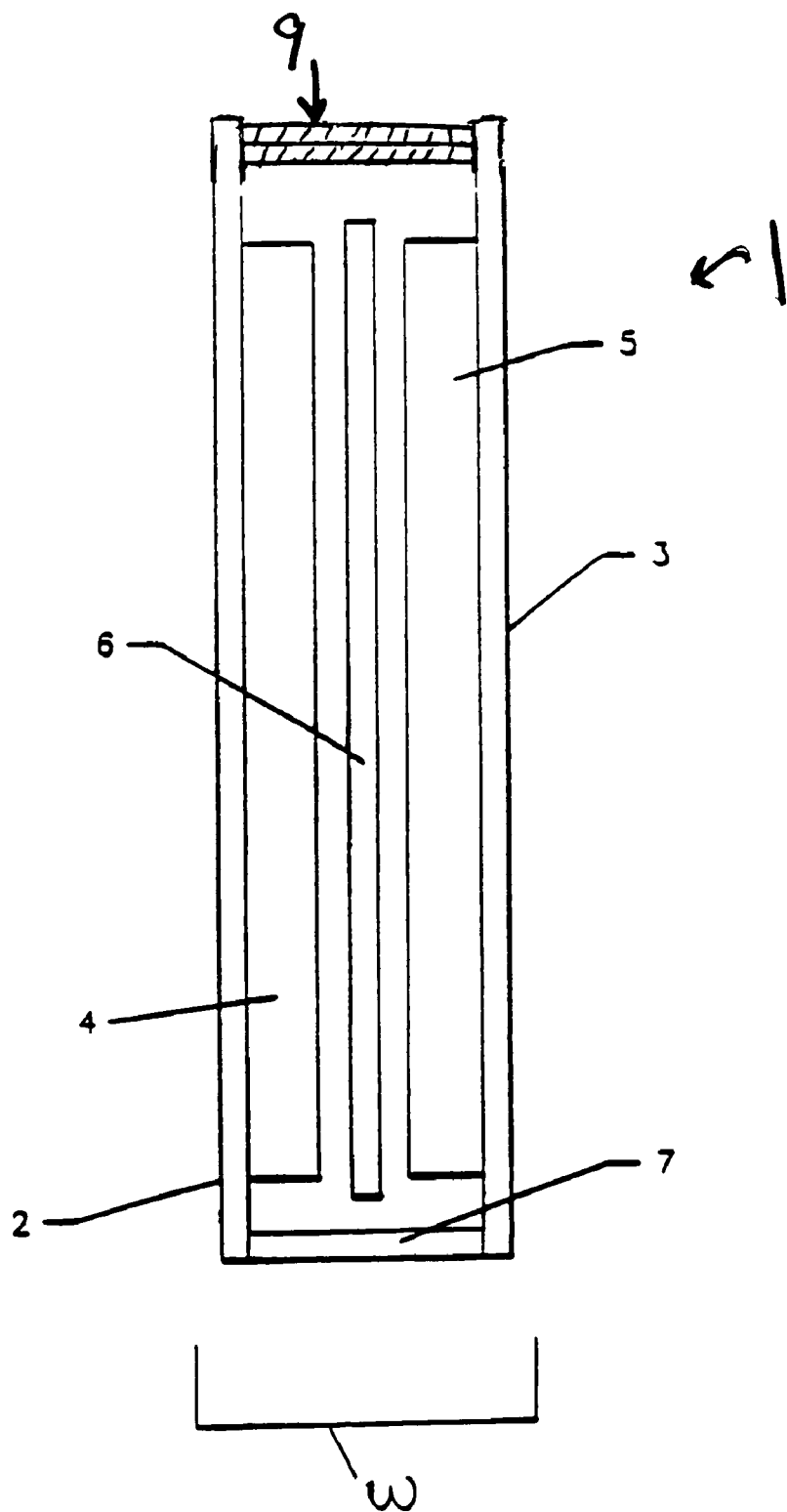
FIG. 3 shows a cross-section view of a bipolar wafer cell with a double-layer gas permeable membrane.
Figure 4:
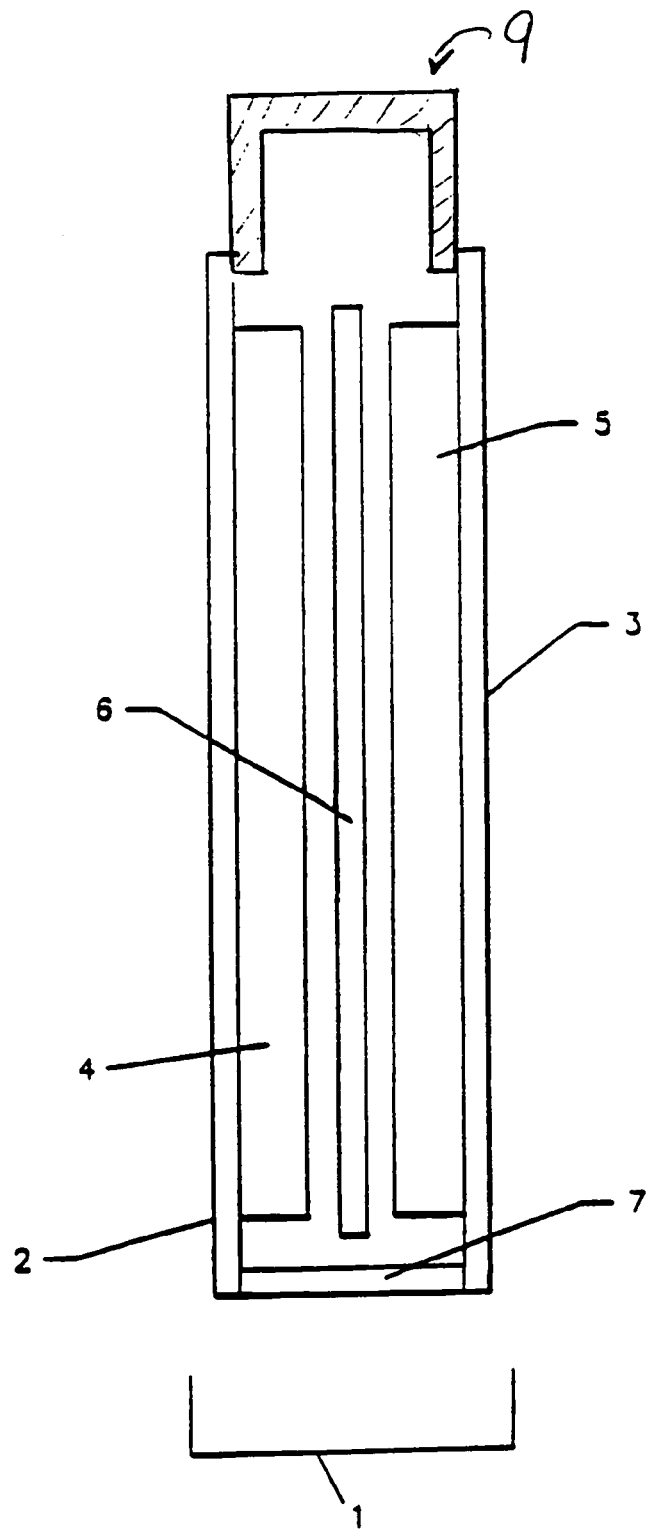
FIG. 4 shows a cross-section view of a bipolar wafer cell with a gas permeable membrane that protrudes outwardly from the cell.
Figure 5:
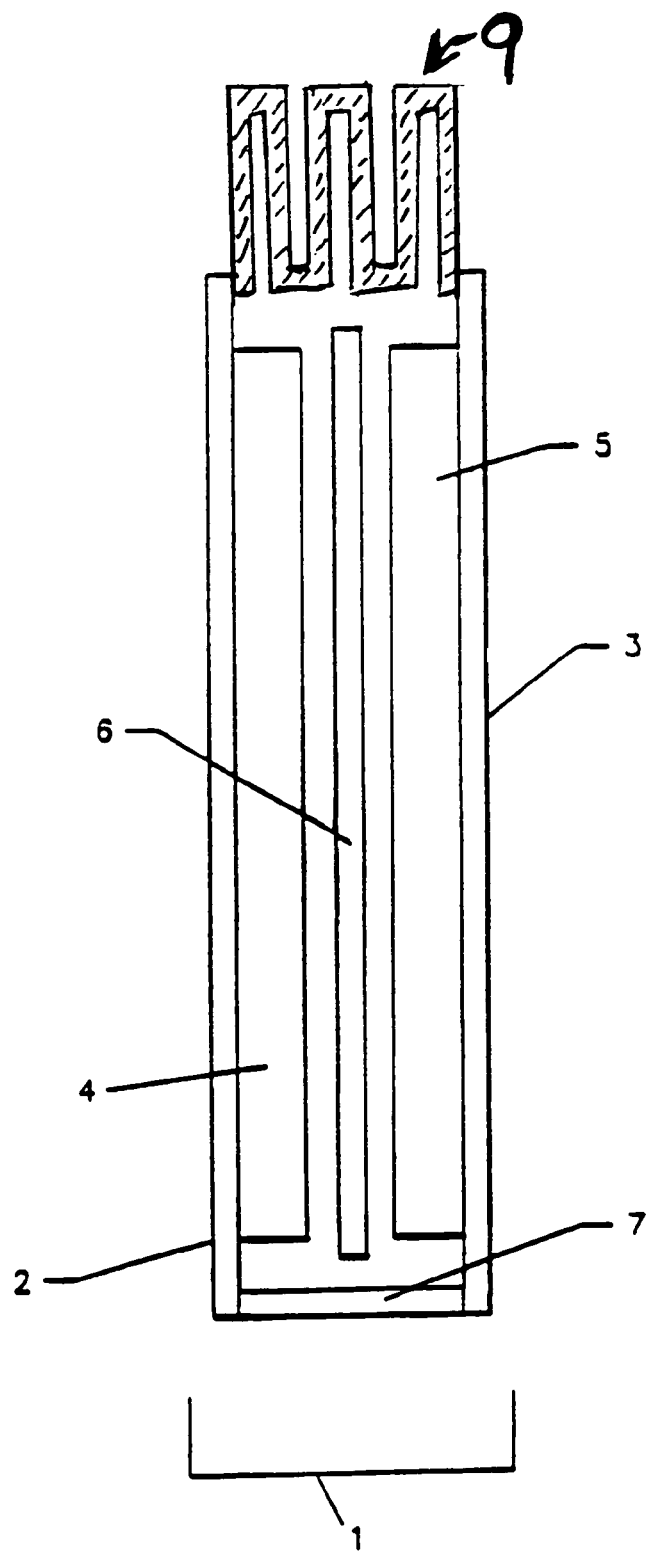
FIG. 5 shows a cross-sectional view of a bipolar wafer cell with a corrugated gas permeable membrane.

In the embodiment of the wafer cell shown in FIGS. 2A–C, the gas permeable membrane 9 is formed as a single layer of membrane material. Generally, the thickness of the layer is not limited to any particular dimension. Moreover, other configurations for the gas permeable membrane are also possible. For example, as shown in FIG. 3, to provide additional reliability the gas port membrane 9 comprises a plurality of layers of membrane material. In another embodiment, as shown in FIG. 4, the gas port membrane 9 is formed as one or more layers of membrane material that are shaped to protrude outwardly from the opening of the cell so as to provide additional surface area. In still another embodiment, as shown in FIG. 5, the membrane 9 is formed as one or more corrugated layers of membrane material. The corrugated shape also provides for additional surface area. Generally, the gas permeable membrane is not limited to any particular size or shape.

In addition to functioning as a gas port for the wafer cell, the gas permeable membrane also provides for a convenient means of filling the wafer cell with electrolyte. For example, the wafer cell may be filled with electrolyte via a syringe inserted through the membrane material. As noted, the membrane material is preferably hydrophobic and the hydrophobic nature of the material will prevent electrolyte from flowing through the small holes or openings produced by the insertion of the syringe needle. Hence, holes or openings (even those large enough to allow gases as well as electrolyte to pass) may be poked into the membrane and the hydrophobic nature of the membrane material will still break the wicking path of the electrolyte so as to prevent the electrolyte from passing through.

Figure 6:
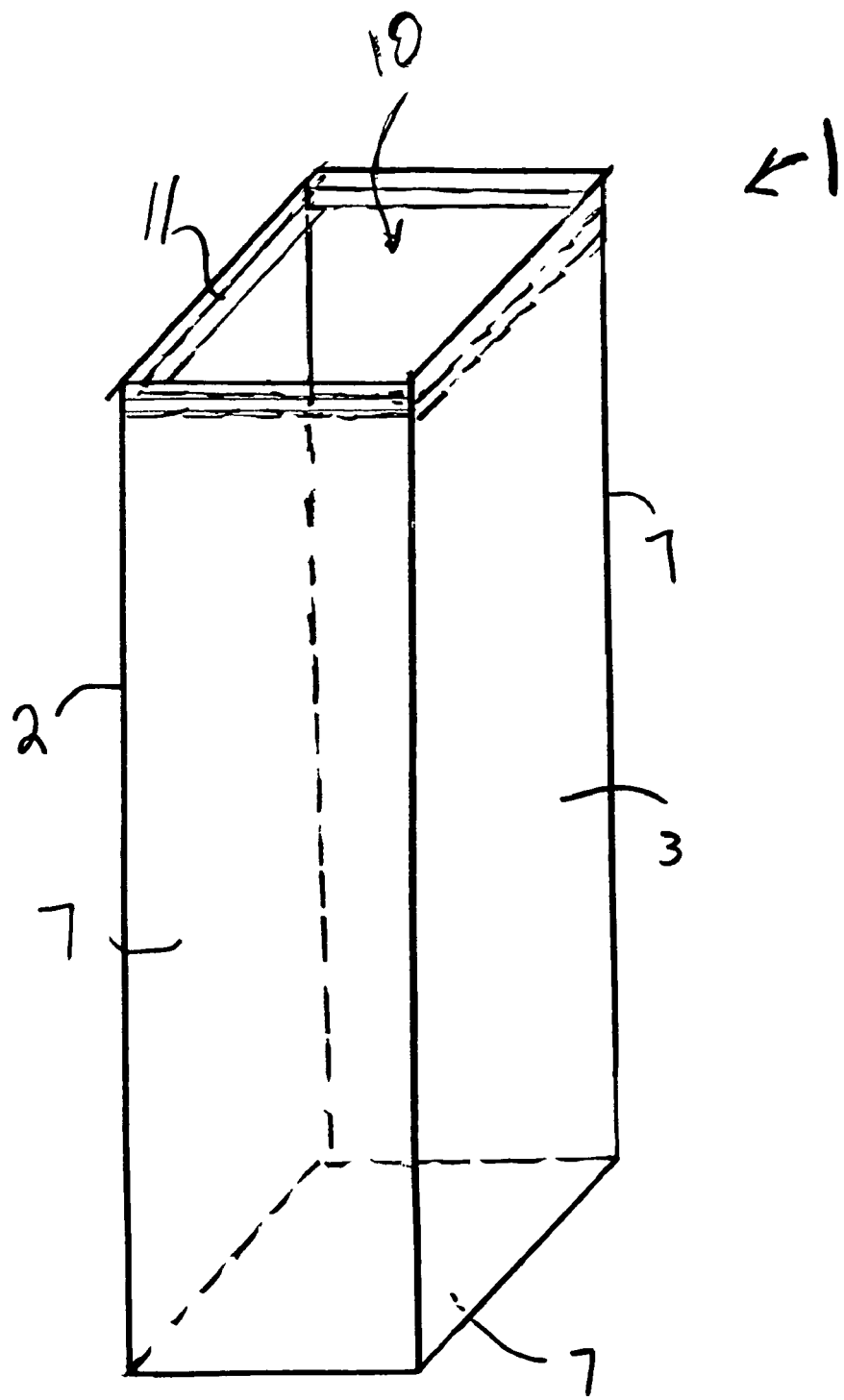
FIG. 6 shows a three-dimensional view of a cell enclosure having an opening with a hydrophobic border.

An alternate embodiment of the wafer cell 1 of the present invention is shown in FIG. 6 (note that for simplicity, the electrodes and separator are not shown). In this embodiment, like those shown in FIGS. 2A–C, 3, 4, 5, the nonconductive border material 7 is sealed peripherally to the conductive outer layers 2 and 3 to form a nonconductive border 7 around a portion of the perimeter of the cell (and, in the particular embodiment, around the bottom and the sides of the perimeter of the wafer cell). The nonconductive border portion 7 and the conductive outer layers 2, 3 form a cell enclosure with an opening 10. The opening 10 is sized to allow the passage of the cell gases into and out of the enclosure, and it may also be sized to allow passage of the electrolyte as well. In this embodiment, a hydrophobic material 11 is placed around the inside perimeter of the opening 10 to form a hydrophobic border around the perimeter of opening 10. As discussed above, an electrolyte path between individual wafer cells may occur by electrolyte "wicking" or "creep" along the first and second conductive portions 2 and 3, thereby causing self-discharge by the ion transfer through the electrolyte path. The hydrophobic border 11 is used to break the wicking path of the electrolyte, thereby preventing the electrolyte from leaving the cell. In the embodiment shown in FIG. 6, the cell gases are free to flow into and out of the wafer cell through the opening 10. More generally, a hydrophobic material may be positioned relative to the opening in the enclosure so as to prevent passage of the electrolyte while still allowing the passage of gases into and out of the enclosure through the opening. The hydrophobic material may partially or totally cover the opening. If the hydrophobic material totally covers the opening, then it should also be gas permeable in order to allow the cell gases to exit and enter the cell.

Figure 7:
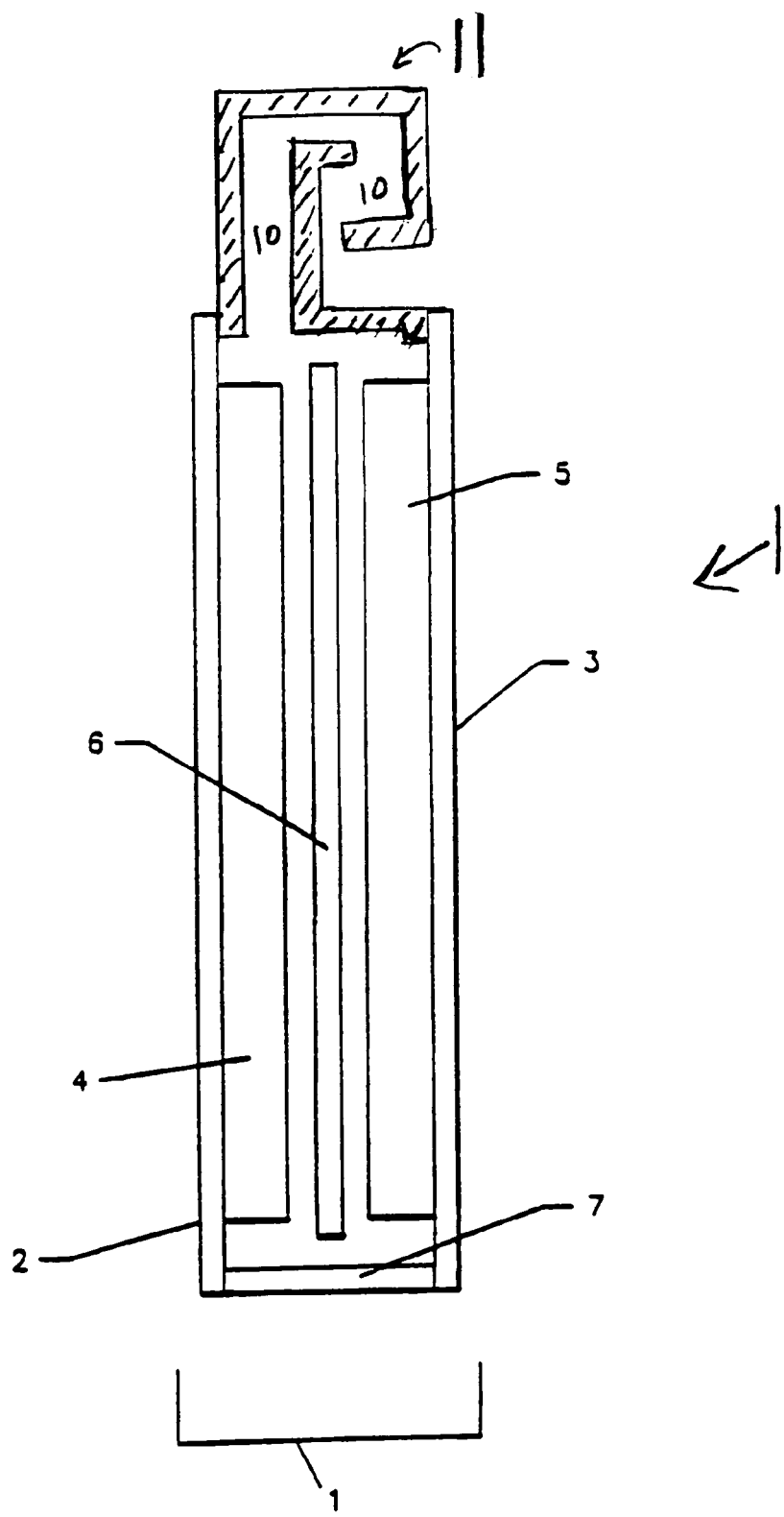
FIG. 7 shows a cross-sectional view of a bipolar wafer cell wherein a hydrophobic material is arranged so that there is an opened circuitous pathway between the interior and exterior of the wafer cell.

As another example, the hydrophobic material 11 may be arranged as shown in FIG. 7 so that the opening 10 takes the form of a circuitous or labyrinthine pathway between the interior and the exterior of the enclosure of wafer cell 1. This may be accomplished in many different ways. An example of one possible way is by rolling together layers of hydrophobic material (such as rolling up the opened end of a bag).

Figure 8:
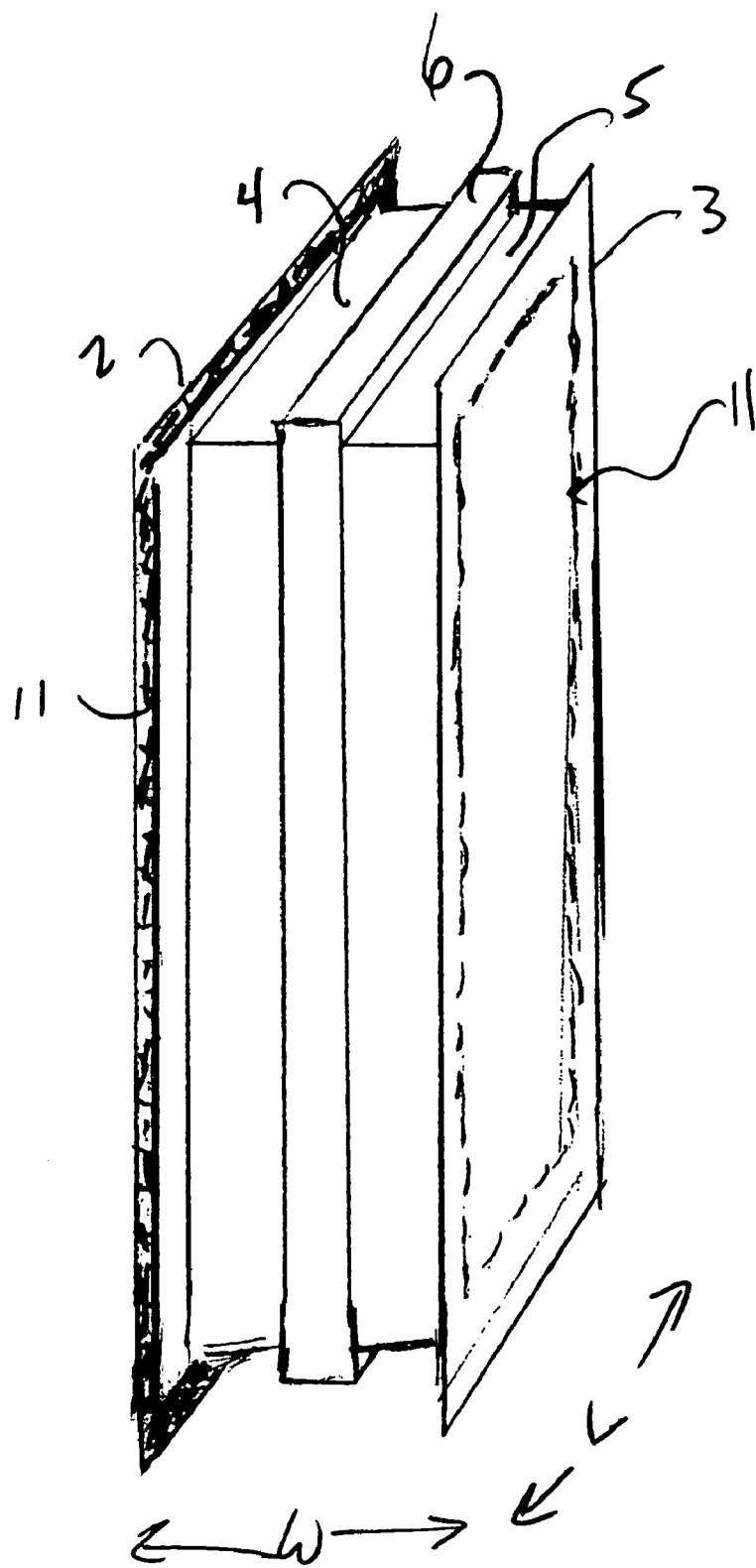
FIG. 8 shows a three-dimensional view of a bipolar cell having a hydrophobic material around the perimeter of the bipolar plates.

Yet another embodiment of the invention is shown in FIG. 8. In this embodiment, the bipolar electrochemical cell 1 comprises a first conductive outer layer 2 and the second outer conductive layer 3. Disposed between the two outer conductive layers is the positive electrode 4, the electrolyte filled separator 6 and the negative electrode 5. In this embodiment, the enclosure for the cell consists of the first and second conductive outer layers 2, 3 while the entire periphery around the bipolar cell is an opening that permits the cell gases to freely leave and enter the cell. It is noted that in this case, the enclosure formed by the first and second outer layers 2, 3 does not completely surround the cell. A hydrophobic material 11 is disposed around the periphery of the first and second outer layers 2, 3 (i.e., preferably around the periphery on the side of the conductive outer layers 2,3 facing the electrodes 4,5) so as to form a hydrophobic border around each of the conductive outer layers 2, 3. The hydrophobic border placed around entire perimeter of each of the conductive outer layers 2, 3 breaks the wicking path of the electrolyte and prevents the electrolyte from leaving the interior of the cell.

It is again noted that, in a preferred embodiment of the present invention, the electrolyte used is an alkaline electrolyte. Hence, the hydrophobic material used to break the wicking path of the electrolyte is thus preferably one that is capable of breaking the wicking path of an alkaline material.

Referring again to FIG. 1, shown is a multi-cell bipolar battery 20 made by stacking several wafer cells 1. The wafer cells are electrically arranged in series with the positive face of each cell (that is, outer layer 2) contacting the negative face of the adjacent cell (that is, outer layer 3). Hence, electrical current is carried between the adjacent wafer cells though the outer layers 2 and 3. The end cells have metal foil contacts, 14 and 15 which conduct the electric current from the battery stack to the positive battery terminal 24 and negative battery terminal 25, respectively. The cell-to-cell contact or the contact between the end cells and the metal foil contacts may be enhanced by use of a conductive paste or cement. The bipolar battery stack assembly may be held in compression to insure uniform physical contact between the adjacent cells and between the respective layers within each cell.

In the embodiment shown in FIG. 1, the electrical current is carried between the adjacent cells through the outer layer 2 and 3 without the use of additional tabs or current collectors that add additional weight, complexity and resistance to the cell. However, it is within the scope of the present invention that external tabs or current collectors could be used in addition to or instead of the conductive outer layers 2, 3 to electrically couple one cell to the next. An embodiment of the present invention which uses electrode tabs and interconnects to electrically connect individual cells is provided below.

As shown in FIG. 1, the stack of wafer cells is housed in an outer battery case 20. The battery case 20 is preferably sealed to avoid the loss of gases from the case. A resealable vent 18, set to release gases above a maximum operating pressure, may be used to safety vent internal gases. Each of the electrochemical cells is in gaseous communication with a common region 22 which is exterior to each of the cells but interior to the battery case. Hence, gas generated by each of the electrochemical cells 1 exits the interior of the cell through the gas port membrane 9 and is free to circulate within the common region 22. The cell gases are also free to re-enter the interior of the cells from the common region 22 (also through the gas port polymeric membrane 9). Hence, the single battery case 20 forms a common pressure vessel for all of the electrochemical cells.

Hence, the membrane 9 serves as a gas port for the electrochemical cell, allowing passage of cell gases into and out of the cell but preventing passage of the cell electrolyte. The membrane gas port 9 is important for equalizing the pressures between the regions inside the cell enclosures and the region 22 within battery case 20 that is outside of the cell enclosures. To avoid mechanical stresses within the battery, an equalization of pressure is also sought within all cell gas cavities within battery case 20. The membrane gas port 9 allows cell gases to flow out of the cell enclosures as cell gases are generated during battery operation, especially during charge at high states of charge. In addition, the membrane gas port allows cell gases to pass into the cell as cell gases are consumed from recombination processes, especially during battery operation after completion of charge. Additionally, the membrane gas port 9 is highly reliable against electrolyte leakage between the wafer cells so as to avoid the formation of electrolytic shorting paths between cells.

The necessary functions of a gas port for the wafer cell 1 are better achieved by the gas permeable membrane 9 of the present invention than by a conventional resealable mechanical vent that is typically used in the battery industry. The gas permeable membrane 9 of the present invention does not prevent the cell from venting below a given maximum operating pressure. This is neither necessary nor desirable in the present invention. The membrane gas port is simpler and less expensive than a mechanical vent. It also has a smaller size (i.e., the membrane may be made extremely narrow) thereby enabling the stacking of very thin wafer cells into a battery case without interference by mechanical vents. Furthermore, the membrane gas port is more reliable that a conventional mechanical vent. Mechanical vents are prone to electrolyte leakage and as well as to failure during repeated use. Additionally, mechanical vents tend to be "one-way" valves so that it may be necessary to install two vents on each wafer cell in order to allow passage of cell gases both into and out of the cells.

As noted, battery case 20 serves as a common pressure vessel for each of the individual cells. The operating pressure within the battery case 20 may be maintained below a maximum operating pressure by a resealable pressure vent 18. This greatly reduces the mechanical strength requirements for the cell enclosures and enables the use of lightweight and inexpensive components that do not need to withstand significant pressures. The pressure of the common pressure vessel is contained by battery case 20, which does need to be constructed with sufficient mechanical strength in order to withstand the maximum operation pressure of the battery. In one embodiment of the invention, the battery may operate at a peak pressure of at least 10 psi, preferably at a peak pressure of at least 25 psi and more preferably at a peak pressure of at least 50 psi. In another embodiment of the invention, the battery may operate at peak pressures up to about 140 psi. Hence, it is preferable that an embodiment of the multi-cell battery case should be able to withstand peak operating pressures from about 10 psi to about 140 psi. Of course, the multi-cell battery and the battery case of the present invention are not limited to such operating pressures.

The battery case 20 is preferably formed of a nonconductive material. Examples of nonconductive materials include plastics and ceramics. Alternately, it is possible that the battery case be formed from a metal such as from a stainless steel (however, in this case, the battery terminals 25, 25 should be electrically insulated from the steel case). The battery case 20 may comprise a container, a lid, and battery terminals. The battery terminals 24, 25 provide electrical connection to the electrically interconnected cells within the case. The battery terminals may comprise a metal foil material electrically connected to the interconnected electrochemical cells within the case. The metal foil material may comprise a copper and/or nickel laminated foil material. The battery case lid may include a nonconductive material to isolate the battery terminals from a stainless steel case. This nonconductive material may be a phenolic glass material which can be attached to the case lid by an adhesive.

In the embodiment of the battery 30 shown in FIG. 1, the battery is a bipolar battery. In particular, the electrochemical cells are wafer cells 1 that are arranged in a bipolar configuration. The cells are arranged in electrical series such that the positive face (conductive outer layer 2) of each cell contacts the negative face (conductive outer layer 3) of an adjacent cell. The adjacent outer layers 2, 3 form the bipolar plates of the bipolar battery. The electrical current is carried between the adjacent cells though the conductive outer layers 2 and 3 without the use of additional tabs or current collectors that add additional weight, complexity and resistance to the cell. However, it is within the scope of the present invention that external tabs or current collected could be used in addition to or instead of the conductive outer layers 2, 3 or instead of the conductive outer layers 2, 3. It is also noted that it is possible that other forms of bipolar cells may be used to form the bipolar battery. (For example, it is possible that adjacent first and second conductive outer layers 2, 3 be replaced by a single bipolar plate. The bipolar plate could be a single layer of conductive polymer.)

Figure 9:
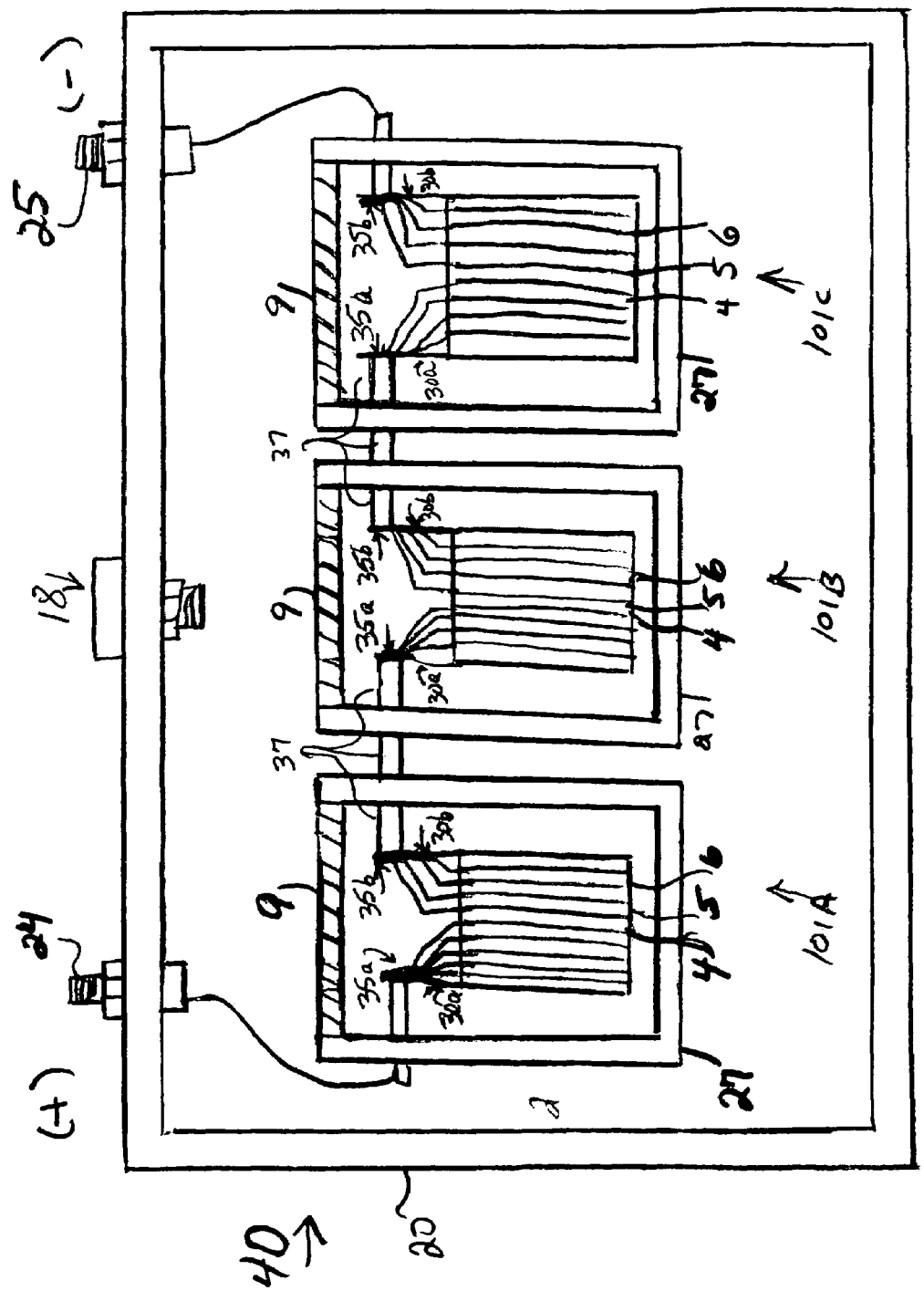
FIG. 9 shows a cross-sectional view of a multi-cell battery of the present invention.

An embodiment of the present invention which uses electrode tabs and interconnects to connect individual cells is shown in FIG. 9. FIG. 9 shows an electrochemical battery 40 comprising a plurality of serially coupled electrochemical cells 101 housed within a battery case 20. Each of the electrochemical cells includes at least one positive electrode 4, at least one negative electrode 5, and electrolyte. Each cell also preferably includes separators 6 disposed between the positive electrodes 4 and the negative electrodes 5.

A cell enclosure 27 accommodates the positive electrodes 4, the negative electrodes 5, the electrolyte and the separators 6 of each of the electrochemical cells. Generally, the cell enclosure 27 may be formed of any material which will not be corroded by the electrolyte. Examples of materials include, not are not limited to, plastics, ceramics and metals (such as stainless steel). If a metal is used, the metal should be electrically insulated from the cell interconnects 35a,35b. Preferably, the enclosure is formed from a nonconductive material such as a nonconductive polymer or ceramic.

In one embodiment, the cell enclosure 27 is formed from a nonconductive polymeric material. Preferably, the polymeric material is impermeable to the passage of the cell electrolyte; however, it may be permeable to the cell gases. An example of a nonconductive polymeric material which may be used is a polypropylene. In one example, the cell enclosure 27 is formed from a polypropylene bag.

The cell enclosure 27 includes the gas port of the present invention which allows passages of the cell gases into and out of the cell but which prevent passage of the cell electrolyte out of the cell. In the embodiment shown in FIG. 9, the gas port is the gas permeable membrane 9. Alternately, as described above, the gas port may be formed as an opening in the enclosure which allows passage of the cell gases into and out of the enclosure. A hydrophobic material is positioned relative to the opening so as to prevent passage of the electrolyte out of the cell. The entire discussion of the gas port, as well as the configurations of the membrane and hydrophobic materials shown in FIGS. 2A–C, 3–7 are, of course, all applicable to the multi-cell battery, such as the one shown in FIG. 9.

FIG. 9 also shows current collection tabs 30a and 30b connected to each of the positive and negative electrodes. In FIG. 9, the tabs 30a are connected to each of the positive electrodes, and the tabs 30b are connected to each of the negative electrodes. All of the current collection tabs 30a are joined together to form a "positive interconnect" 35a. As well, all of the negative tabs 30b are joined together to form a "negative interconnect" 35b. Preferably, the tabs are mechanically joined together by welding. As noted, the individual electrochemical cells are electrically interconnected. Each cell may be electrically connected to another cell either in series or in parallel. Preferably, all of the cells are serially electrically connected together. The electrochemical cells may be electrically connected in series through the enclosures by electrically connecting the positive interconnect of one cell to the negative interconnect of the next cell. A serial interconnection between cells is shown in FIG. 9. FIG. 9 shows 3 electrochemical cells 101A, 101B, and 101C that have been serially coupled together. As serial interconnection is achieved by connecting the negative interconnect 35b of the cell 101A to the positive interconnect 35a of the next adjacent cell 101B. The negative interconnect of the cell 101B is electrically connected to the positive interconnect of the cell 101C.

Preferably, the positive and negative interconnects 35a and 35b are electrically connected by welding the interconnect together. A "connection spacer" 37 may be welded between the interconnects to provide distance between adjacent electrochemical cells. The connection spacer 37 may comprise nickel, copper, a nickel alloy, a copper alloy, a nickel-copper alloy, a copper-nickel alloy. Further the connection spacer may comprise both copper and nickel. For example, the connection spacer may comprise nickel-plated copper, or the connection spacer may comprise a copper control portion surrounded by nickel. Alternatively, the connector may comprise a copper cylinder which is wrapped with a nickel wire. The electrical connection is accomplished through the cell enclosures. The region where the interconnects are joined together is called the "interconnection region". It is possible that electrolyte can escape from each cell enclosure at the interconnection region. To prevent the escape of electrolyte, each cell enclosure is sealed at the interconnection region by an "interconnection region seal". The interconnection region seal may include a polymer gasket such as an EDPM rubber gasket. Furthermore, the interconnection region seal may be selected from the group consisting of a hot melt adhesive, and an epoxy adhesive.

The electrochemical cells 101A,B,C are housed in a battery case 20 having positive and negative battery terminals 24,25. The battery case 20 preferably also has a resealable vent 18. The battery case 20 was described above and that discussion is, of course, applicable to the embodiment shown in FIG. 9.

In the electrochemical cells of the present invention, the positive electrode may comprise any active positive electrode material. Likewise, the negative electrode may comprise any active negative electrode material. Examples of positive electrode materials are powders of lead oxide, lithium cobalt dioxide, lithium nickel dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, nickel oxide, nickel hydroxide, manganese hydroxide, copper oxide, molybdenum oxide, carbon fluoride, etc. Preferably, the positive active material is a nickel hydroxide material. Examples of negative electrode materials include metallic lithium and like alkali metals, alloys thereof, alkali metal absorbing carbon materials, zinc, cadmium hydroxide, hydrogen storage alloys, etc. Preferably, the active negative electrode material is a hydrogen storage alloy. It is within the spirit and intent of this invention that any hydrogen storage alloy can be used. It is noted that as used herein, the terminology "hydrogen storage alloy" and "hydrogen absorbing alloy" may be used interchangeably.

Some extremely efficient electrochemical hydrogen storage alloys were formulated, based on the disordered materials described above. These are the Ti—V—Zr—Ni type active materials such as disclosed in U.S. Pat. No. 4,551,400 ("the '400 patent") the disclosure of which is incorporated herein by reference. These materials reversibly form hydrides in order to store hydrogen. All the materials used in the '400 patent utilize a generic Ti—V—Ni composition, where at least Ti, V, and Ni are present and may be modified with Cr, Zr, and Al. The materials of the '400 patent are multiphase materials, which may contain, but are not limited to, one or more phases with $C_{14}$ and $C_{15}$ type crystal structures.

Other Ti—V—Zr—Ni alloys, also used for rechargeable hydrogen storage negative electrodes, are described in U.S. Pat. No. 4,728,586 ("the '586 patent"), the contents of which is incorporated herein by reference. The '586 patent describes a specific sub-class of Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other hydrogen absorbing alloy materials are discussed in U.S. Pat. Nos. 5,096,667, 5,135,589, 5,277,999, 5,238,756, 5,407,761, and 5,536,591, the contents of which are incorporated herein by reference.

Both the positive and negative electrodes may be either non-paste type or a paste-type electrodes. The positive and negative electrodes may be fabricated as paste-type electrodes by mixing the active materials with a binder. The mixing may be done with a liquid (i.e., wet mixing) or without a liquid (i.e., dry mixing) to form a cohesive structure in which the active particles are embedded.

The active materials may be applied to conductive substrates to form the electrodes. It is possible to apply the active mixture to a separate conductive support structure (such as a conductive foam, mesh, expanded metal, perforated metal, etc).

Alternatively, referring again to the embodiment the bipolar battery wafer cell shown in FIG. 2A, it is noted that the positive electrode 4 may simply be a positive active material which is affixed to the inner surface of the first conductive outer layer 2. Likewise, the negative electrode 5 may simply be a negative active material which is affixed to the inner surface of the second conductive outer layer 3.

The conductive outer layers 2, 3 may be textured to provide appropriate support for the active material.

As noted above, in one embodiment of the present invention, each electrochemical cell is a nickel-metal hydride cell comprising negative electrodes including hydrogen storage materials as the active material, and positive electrodes including nickel hydroxide active material.

Hence, in an embodiment of the present invention, the mutli-cell battery is a nickel-metal hydride multi-cell battery. The multi-cell battery of the present invention may thus operate at pressures of at least the standard operating pressures of a sealed nickel-metal hydride battery. This may vary depending upon the actual hydrogen storage alloys, nickel hydroxide materials used as the active materials. In one embodiment of the invention, the multi-cell battery may operate at a peak pressure of at least 10 psi, preferably at a peak pressure of at least 25 psi and more preferably at a peak pressure of at least 50 psi. In another embodiment of the invention, the multi-cell battery may operate at peak pressures up to about 140 psi. Hence, it is preferable that an embodiment of the multi-cell base case (such as the case 20 shown in FIGS. 1 and 9) should be able to withstand peak operating pressures from about 10 psi to about 140 psi. Of course, the multi-cell battery and multi-cell case of the present invention are not limited to such operating pressures.

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims appended hereinafter.

We claim:

1. A multi-cell battery, comprising:
   a battery case; and
   a plurality of electrochemical cells housed in said battery case, each of said cells including:
      at least one positive electrode, at least one negative electrode and an electrolyte; and
      an enclosure housing said at least one positive electrode, said at least on one negative electrode and said electrolyte, said enclosure including a gas permeable membrane allowing passage of cell gases into and out of said cell but preventing passage of said electrolyte out of said cell, said membrane comprising at least one corrugated layer of a membrane material.

2. The battery of claim 1, wherein said membrane material is a polymeric material.

3. The battery of claim 1, wherein said membrane material is a hydrophobic material.

4. The battery of claim 1, wherein said membrane protrudes outwardly from said cell.

5. The battery of claim 1, wherein said plurality of cells are electrically coupled in series.

6. The battery of claim 1, wherein said battery case is a common pressure vessel for each of said electrochemical cells.

7. The battery of claim 1, wherein battery operates at a peak pressure of at least 10 psi.

8. The battery of claim 1, wherein said enclosure is formed from an electrically nonconductive material.

9. The battery of claim 1, wherein said enclosure comprises a polymeric material.

10. The battery of claim 1, wherein each of said electrochemical cells is a bipolar cell.

11. The battery of claim 1, wherein said at least one negative electrode comprises a hydrogen storage alloy.

12. The battery of claim 1, wherein said at least one positive electrode comprises a nickel hydroxide material.

13. The battery of claim 1, wherein said electroyte comprises an alkaline material.

14. A multi-cell battery, comprising:
   a battery case; and
   a plurality of electrochemical cells housed in said battery case, each of said cells including:
   at least one positive electrode, at least one negative electrode and an electrolyte; an enclosure housing said at least one positive electrode, said at least one negative electrode and said electrolyte, said enclosure having an opening allowing passage of cell gases into and out of said cell; and
   a hydrophobic material positioned relative to said opening so as to prevent passage of said electrolyte out of said cell; said opening being a circuitous pathway formed by said hydrophobic material.

15. The battery of claim 14, wherein said hydrophobic material is disposed along the periphery of said opening.

16. The battery of claim 14, wherein said hydrophobic material partially seals said opening.

17. The battery of claim 14, wherein said hydrophobic material is gas permeable.

18. The battery of claim 14, wherein said hydrophobic material comprises at least one hydrophobic layer.

19. The battery of claim 14, wherein said plurality of cells are electrically coupled in series.

20. The battery of claim 14, wherein said battery case is a common pressure vessel for each of said electrochemical cells.

21. The battery of claim 14, wherein said battery operates at a peak pressure of at least 10 psi.

22. The battery of claim 14, wherein said enclosure is formed from an electrically nonconductive material.

23. The battery of claim 14, wherein said enclosure comprises a polymeric material.

24. The battery of claim 14, wherein each of said electrochemical cells is a bipolar cell.

25. The battery of claim 14, wherein said at least one negative electrode comprises a hydrogen storage alloy.

26. The battery of claim 14, wherein said at least one positive electrode comprises a nickel hydroxide material.

27. The battery of claim 14, wherein said electrolyte comprises an alkaline material.

* * * * *